Jan. 24, 1967   H. AMACHER   3,299,778
CIRCULAR SAWS
Filed Aug. 9, 1965
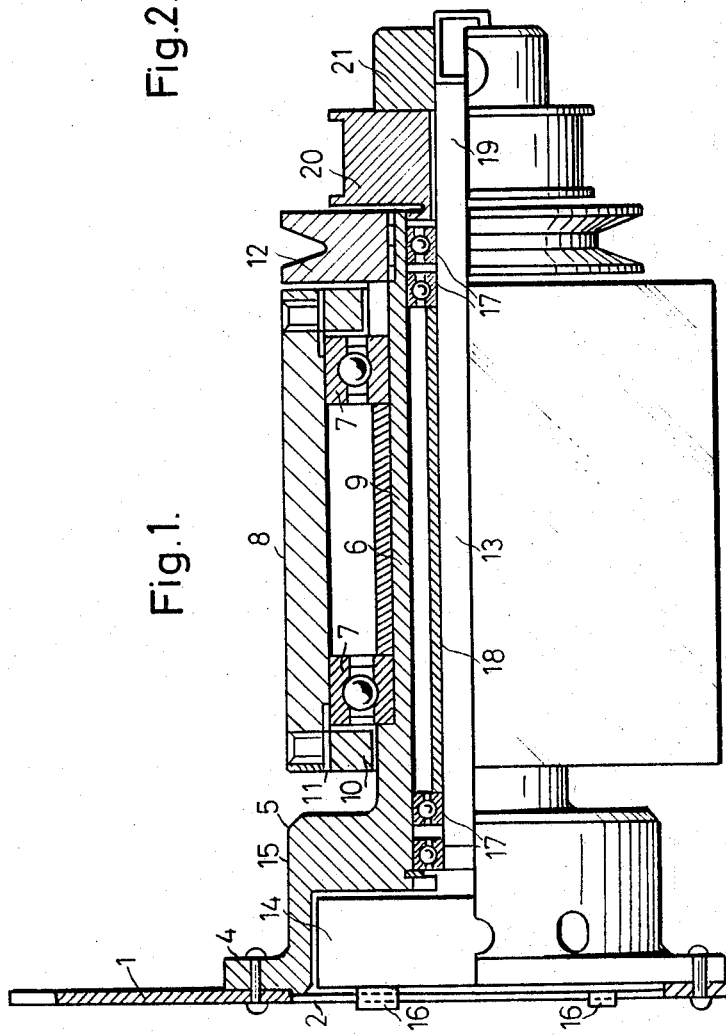
INVENTOR:
Hans Amacher
By
Watson, Cole, Grindle and Watson
Attorneys 3,299,778
CIRCULAR SAWS
Hans Amacher, Lettenweg 76, Allschwil,
Basel-Land, Switzerland
Filed Aug. 9, 1965, Ser. No. 478,038
Claims priority, application Switzerland, Aug. 31, 1964,
11,361/64
5 Claims. (Cl. 90—11)

This invention relates to circular saws.

Circular saws comprising an adjusting cutter arranged in a central aperture formed in the saw blade, are used for machining lead, zinc and blocks of plastics material, particularly in the graphic art. In this case, the adjusting cutter is secured directly to, or is fixed with a driving shaft carrying the saw blade. As a result, the peripheral speed of the cutting edges of the adjusting cutter is much lower than the peripheral speed of the saw blade and, in most cases, only amounts to about one third of such speed. Since the machine operator generally tends to adjust the feed rate of the work pieces being machined mainly to the performance of the saw blade rotating at a higher peripheral speed, the adjusting cutter does not operate efficiently. On the other hand, it is not advisable to adapt the feed rate of the work pieces to the performance of the adjusting cutter because it involves a corresponding waste of time and prevents the saw blade from working efficiently.

An object of the present invention is to obviate these disadvantages by arranging that the cutting block be driven at a higher speed of rotation than the saw blade. The saw blade and the cutting block may be driven together by connecting between them a transmission gear preferably arranged in a housing of the circular saw. However, since the cutting block generally has to be rotated at fairly high speeds, for example at 12,000 r.p.m., it is of advantage to drive the saw blade and the cutting head independently of one another.

An embodiment of the invention is more fully explained hereinafter with reference to the accompanying drawings in which FIG. 1 is a view, partly in central longitudinal section, and FIG. 2 is a side view.

The circular saw shown in the drawings comprises a saw blade 1 which has a central, circular aperture 2 and is detachably secured by screws 3 to a flange 4 of a hub 5. The hub 5 is at the free end of a hollow shaft 6 which is mounted in two ball bearings 7 for rotation in a housing 8. The bearings 7 are prevented from being axially displaced relative to one another by means of a spacer tube section 9. The housing 8 is sealed at each end by a screw ring 10 which is adjustably screwed into an inner thread 11 in the housing 8 and is protected against displacement.

On that end of the hollow shaft 6 remote from the saw blade 1, is a V-belt pulley 12 by means of which the hollow shaft 6 can be driven at a rotational speed of 3800 r.p.m.

Guided through the hollow shaft 6 is a central shaft 13 at the free end of which is mounted a cutting block 14. The cutting block 14 is sunk in a recess 15 of the hub 5 with clearance on all sides, and its outer face is provided with adjusting members 16. The shaft 13 is mounted in ball bearings 17, axial displacement of which is prevented by a spacer tube 18, for rotation in the hollow shaft 6. A free end portion 19 of the shaft 13 projects from the hollow shaft 6. Mounted on this end portion 19 is a pulley wheel 20 which is adapted to be driven at about 12,000 r.p.m. i.e. at approximately 3 times the rotional speed of the hollow shaft 6. The pulley 20 is locked by means of a nut 21 which is screwed on a corresponding thread on the end section 19.

The pulley wheels 12 and 20 can be driven by a single motor through a suitable belt transmission drive.

The unit shown in FIG. 1, sunk over half way into a box or housing accommodating gear elements (not shown), the cover of the box serving as a table for supporting the work pieces to be machined.

What is claimed is:

1. A circular saw comprising a rotatable saw blade with a central aperture, and an adjustable cutting block arranged in said aperture, and means connected to the saw blade and the block with the block rotatable at a higher speed than said saw blade.

2. A circular saw comprising a rotatable saw blade with a central aperture, a cutter block arranged in said aperture, and means connected to the saw blade and the block, said block rotating with a peripheral speed approximately equal to the peripheral speed of said blade.

3. A circular saw comprising a hollow rotatable shaft; a circular saw blade mounted on an end of said shaft, said blade having a central aperture; a central shaft rotatable within said hollow shaft; a cutter block arranged within said central aperture on an end of said central shaft; means for rotating said hollow shaft; and means for rotating said central shaft at a speed so that the speed of rotation of said cutter block is greater than the speed of rotation of said blade.

4. A saw as claimed in claim 3 in which a single driving motor and transmission gearing are provided, said shafts being driven by the single driving motor, said motor being connected with said shafts by the transmission gearing.

5. A circular saw comprising a hollow rotatable shaft; a first drive wheel mounted on one end of said hollow shaft; a circular saw blade mounted on the other end of said hollow shaft, said blade having a central aperture therein; bearings within said hollow shaft; a central shaft supported in said bearings for rotation within said hollow shaft, one end of said central shaft projecting beyond the end of said hollow shaft on which said first drive wheel is mounted; a second drive wheel mounted on said projecting end of said central shaft; and a cutter block mounted on the other end of said central shaft, said block being located within said aperture in said blade; said second drive wheel being driven at a speed such that said cutter block will rotate at a speed greater than the speed of rotation of said saw blade.

References Cited by the Examiner
UNITED STATES PATENTS 1,723,999  8/1929  Bernard _____ 90—11 X
2,185,382  1/1940  Newton _____ 90—11

WILLIAM W. DYER, JR., *Primary Examiner.*

G. A. DOST, *Assistant Examiner.*